United States Patent Office 3,468,382
Patented Sept. 23, 1969

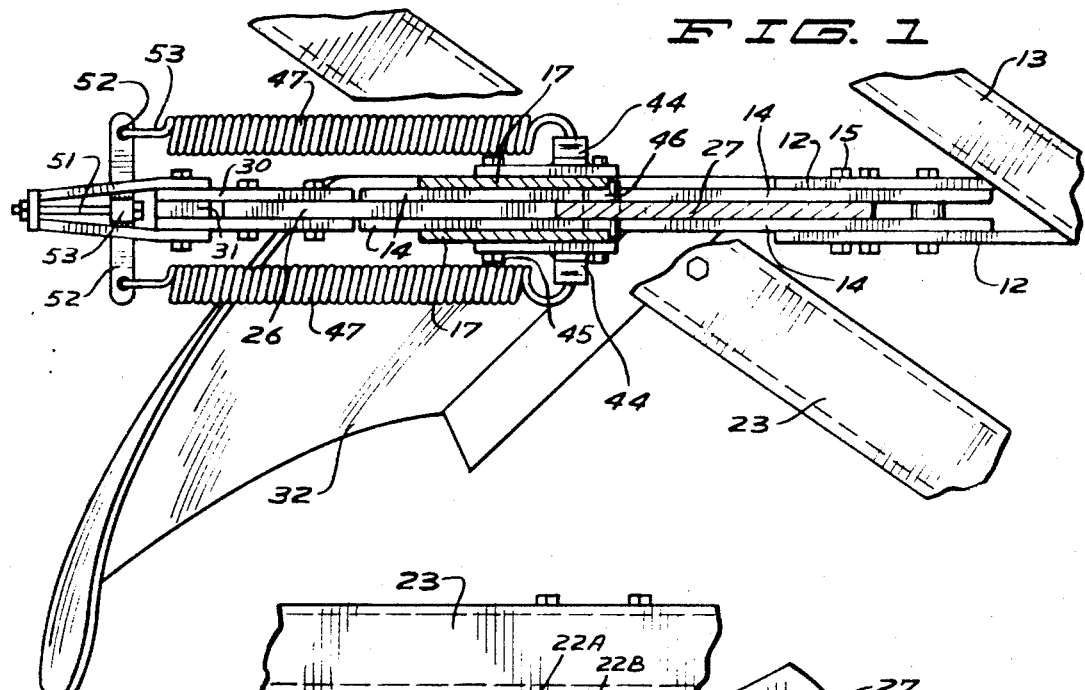
FIG. 1
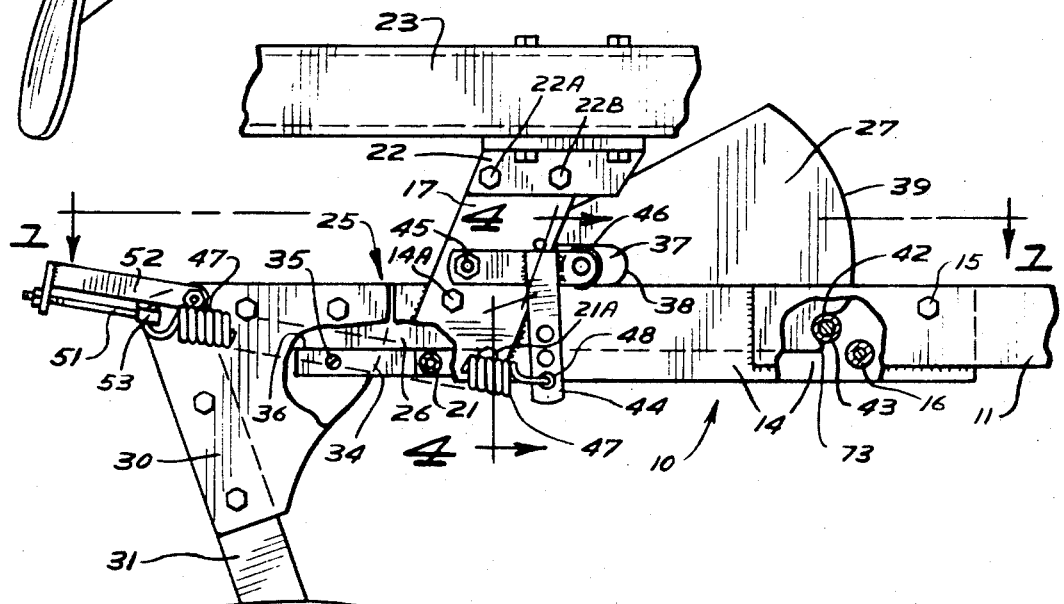
FIG. 2
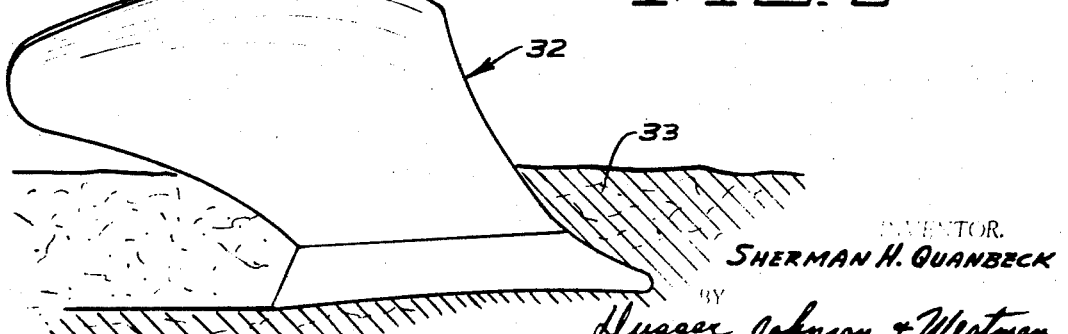
INVENTOR.
SHERMAN H. QUANBECK
BY Dugger Johnson & Westman
ATTORNEYS

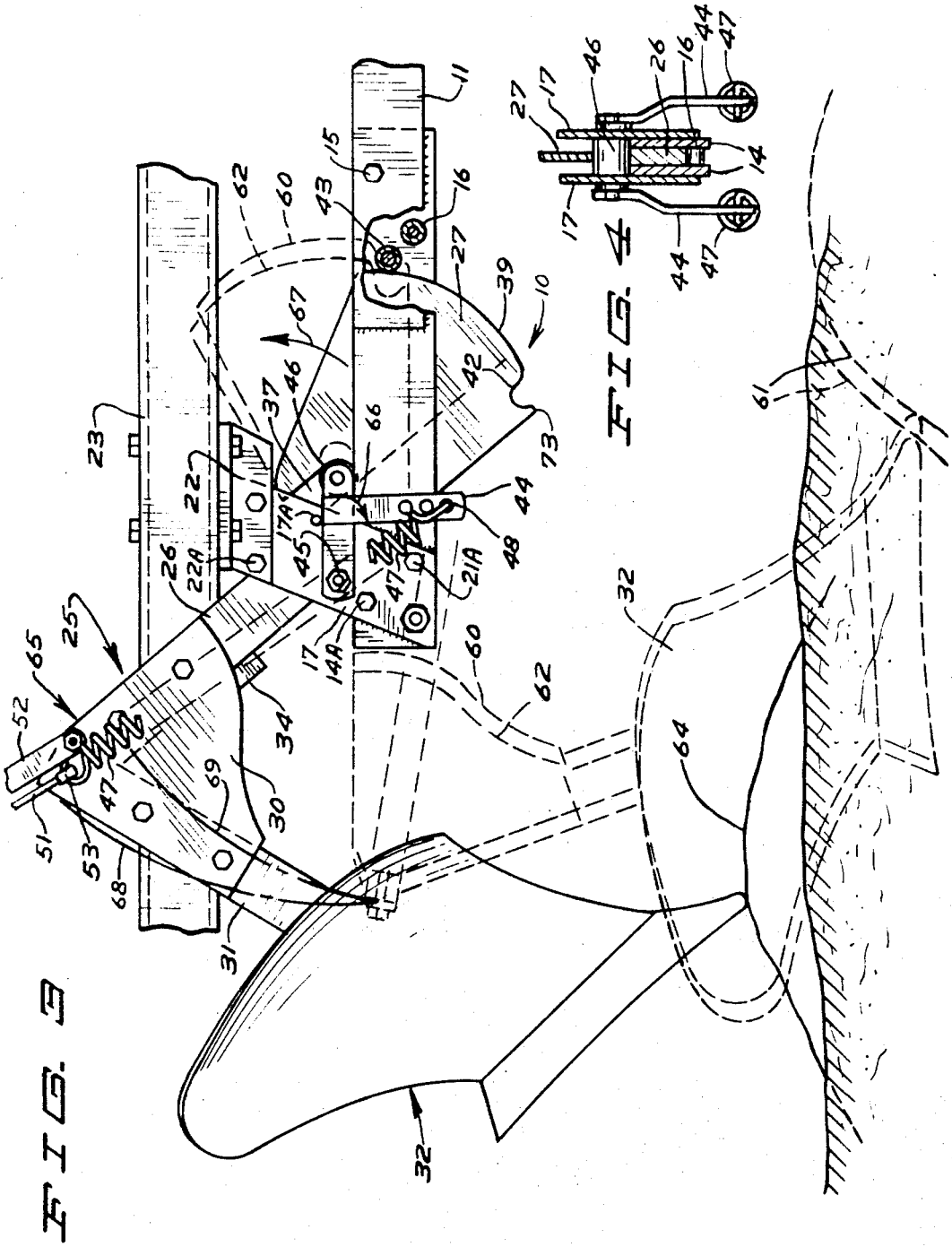

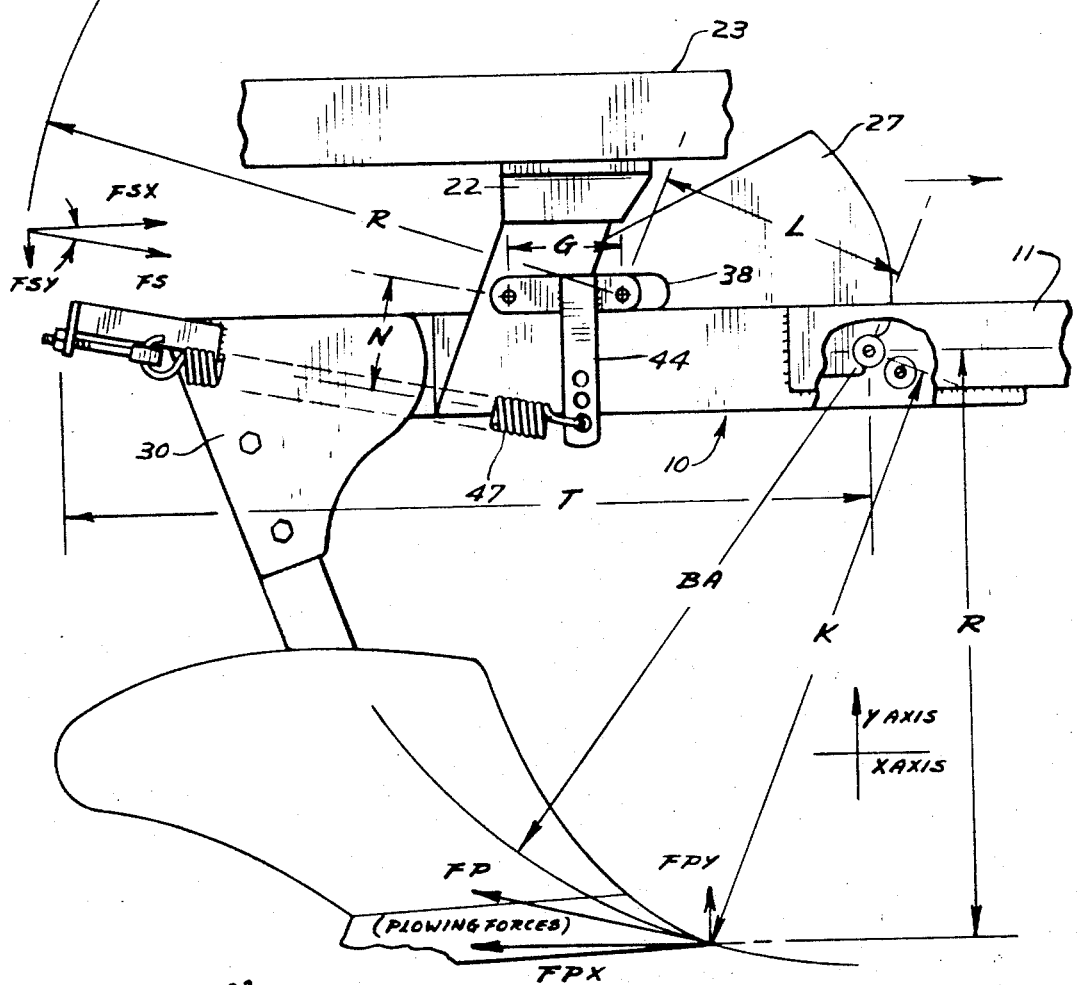
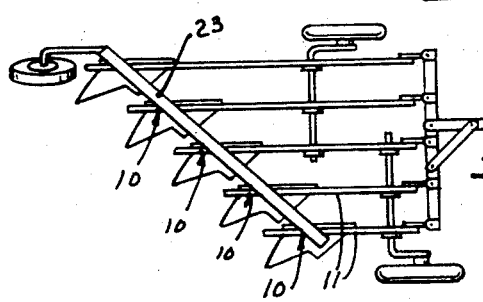

3,468,382
TRIP BEAM FOR IMPLEMENT
Sherman H. Quanbeck, Aneta, N. Dak. 58212
Filed Oct. 21, 1965, Ser. No. 499,805
Int. Cl. A01b *61/04*
U.S. Cl. 172—264
15 Claims

ABSTRACT OF THE DISCLOSURE

An earth working tool pivoting support beam which trips when obstructions are encountered. The support frame for the beam permits the beam to trip to give high clearance. And still holds the trip beam in rigid assembly. Springs are used for resetting the earth working tool to a working position.

---

The present invention has relation to a trip beam plow and more particularly to an improved trip beam plow which will yield to permit the mold board of the plow to raise to clear rocks and like objects in the ground and will automatically return to its working position under normal conditions.

This application relates to certain improvements over the trip beam plow shown in Patent No. 3,052,308. One of the advantages of the invention described in the present application is that the beam will automatically reset under the urging of tension springs which are mounted in such a manner that the tension of the springs is not dependent upon a cam action as the plow share raises during its tripping operation but is due to the geometry of the spring mounting. This eliminates many of the problems present when the device shown in Patent No. 3,052,308 is modified to provide a self-setting action.

The trip beam plow mechanism illustrated in the present application is simplier to make, has fewer parts and therefore is less costly. In the arrangement as shown herein, the plow frame can also be raised to improve the trash clearance of the plow shares. The trip beam features with automatic setting are also available. Further, the trip beam of the present invention permits the individual plow shares of a gang plow to individually ride over small rocks or objects in the field as shown in Patent No. 3,052,308 but with a much less complicated and easier to make mechanism. Only two main springs are necessary to permit yielding of the plow share and resetting thereof about small objects and also permit full tripping action with automatic resetting.

Therefore, it is an object of the present invention to present a simple mechanism for a trip beam implement which will permit the attached earth working tool to yield vertically and horizontally and oriented so that when tripped the earth working tool does not dig further into the ground upon tripping, and will automatically reset the tool to its working position when the obstruction has been cleared.

In the drawings,

FIG. 1 is a fragmentary part sectional view of a plow beam having a tripping mechanism made according to the present invention installed thereon, and taken as on line 1—1 in FIG. 2;

FIG. 2 is a fragmentary side elevational view of the device of FIG. 1;

FIG. 3 is a fragmentary side elevational view of the device of FIG. 1 showing it in a fully tripped position;

FIG. 4 is a sectional view taken as on line 4—4 in FIG. 2;

FIG. 6 is a force diagram showing the plowing forces on the mechanism; and

FIG. 7 is a schematic view of a gang plow.

Figure 5:
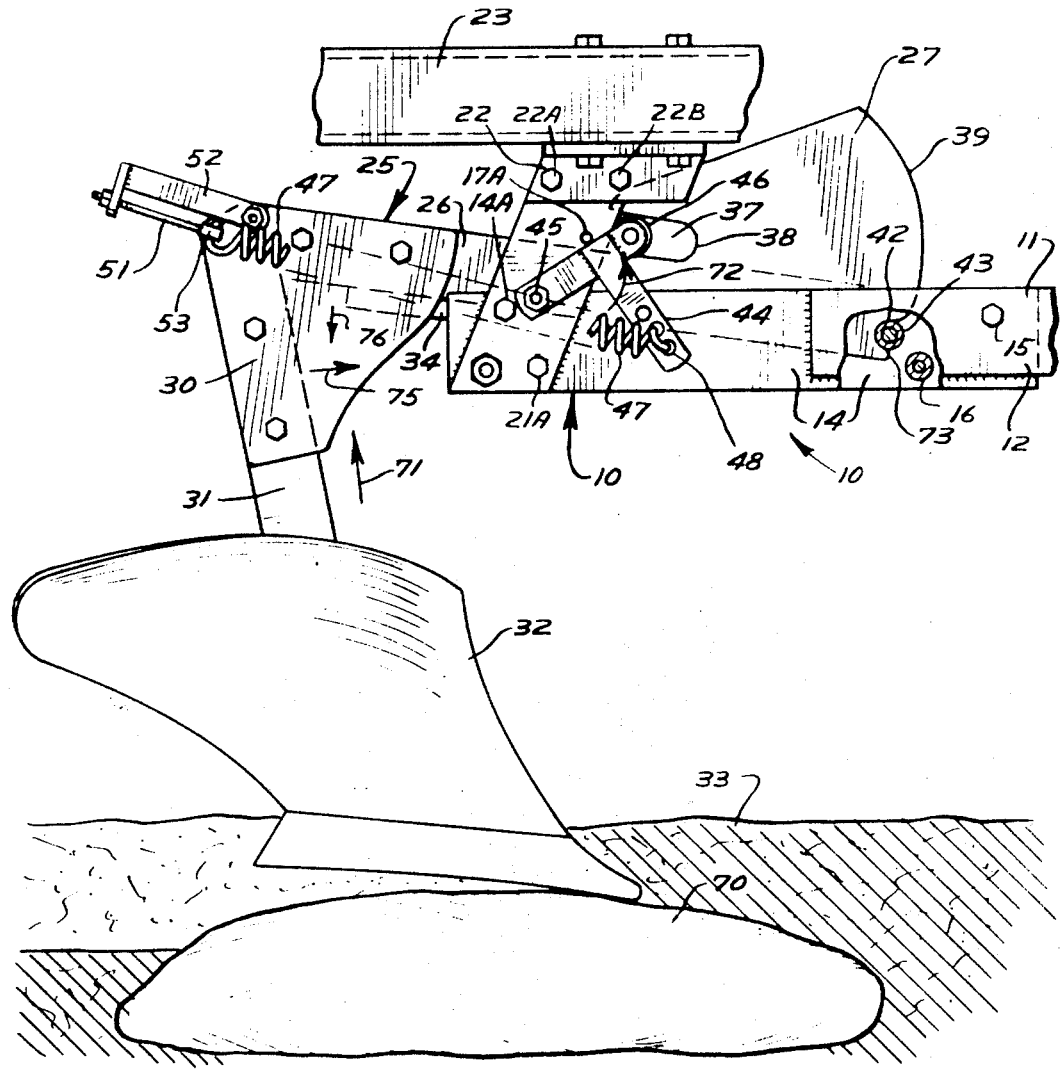
FIG. 5 is a side elevational view of the device of FIG. 1 showing it in clearing relationship to a small obstruction in the field being plowed.

Referring to the drawings and the numerals of reference thereon, a plow trip beam illustrated generally at 10 includes a normally fore and aft extending main beam 11, which may be the only beam of a plow or other implement. However, in the usual case, the fore and aft main beam 11 will be attached to a frame formed of a plurality of such beams which are parallel to each other and form a gang plow in the conventional manner. The member 11 includes a pair of spaced apart plates 12, 12 which may be removably fastened to a suitable cross angle 13, if desired.

The main beam also includes a pair of spaced apart, substantially parallel slide housing plates 14, 14 which are fixedly attached to the plates 12, 12 and extend rearwardly therefrom. The assembly made by the two plates 12 and the two plates 14 is held together with the plates in spaced relation through the use of suitable bolts 15 with spacers 16 mounted on the bolts and between the plates 12, 12 and 14, 14. The spacers 16 maintain the plates 12 and 14 in spaced parallel relationship, as shown.

A pair of upright, forwardly extending plates 17 are mounted adjacent the rear of the slide housing plates 14 and extend upwardly therefrom. The plates 17 are positioned on the outside of the housing plates 14. The plates 17 are joined to the housing plates 14 in a manner so that the space between the slide housing plates 14 is clear and unobstructed except adjacent lower portions where suitable bolts having spacers, as shown at 21 are provided for holding the plates 17 in place. Plates 17 are also held in place by countersunk head bolts 14A. The heads are countersunk into plates 14 so that they don't interfere with movement of the beam. The spacers on bolts 21 are provided with shims to take up wear.

The upper ends of the plates 17 are attached to suitable angle clips 22 which in turn are bolted to a box support beam 23 which extends across the width of the plow and supports the rear of the beam members 11. In a gang plow it supports several trip beams. The attachment of the plates 17 to the angle clips 22 can be made in such a manner so that the plates 17 can be adjusted for width in order to compensate for wear of the parts which slide between these plates 17 and the slide housing plates 14.

A trip or beam slide assembly illustrated generally at 25 includes a slide bar 26 which is positioned between the slide housing plates 14, 14 and is mounted for longitudinal sliding movement in these plates. The bar will slide along the top of the spacer and bolt assemblies such as spacer 21. A cam plate 27 is fixed to the top edge of the slide bar 26 adjacent the forward portions thereof and extends upwardly above the housing plates 14 as shown. The cam plate is coplanar with the slide bar. A pair of standard plates 30, 30 are bolted to opposite sides of the slide bar 26 adjacent the rear portions of the bar and rearwardly from the housing plates 14. The standard plates 30 in turn are bolted to a mold board standard 31 on which a conventional mold board or plow share 32 is mounted. A shear bolt can be provided between the plates 30 and the standard 31 as an extra safety measure. The plow share 32 travels through the ground illustrated at 33 and turns it over in a conventional manner when the beam assembly 10 is drawn along the ground by the plow frame. The slide bar, cam plate, plow share and brackets comprise the trip or slide beam assembly. The share 32 is illustrative of the type of earth working tool that can be used. Middlebusters, cultivators or other tools can be used.

A short replaceable support bar 34 is also mounted between the standard plates 30 by the lower edge of bar 26 and with a bolt 35. The support bar 34 is supported by the bar 26 as shown at 36. The bar 34 slidably fits between the lower rear portion of the slide housing plates 14, as shown, and stops just rearwardly of the spacer and bolt 21. The slide bar 26 is positioned above the spacer and bolt 21. The bar 34 provides a greater surface to resist the torsion load which is exerted on the slide bar from the plow share and reduces the chance of excessive friction developing and preventing the slide bar from functioning properly. The slide bar may be economically replaced when excessive wear occurs.

The cam plate 27 portion of the slide beam assembly 25 has a rearwardly open notch or slot 37 defined therein adjacent the rear portions thereof. The notch or slot 37 is above the housing plates 14. The bottom edge surface defining the notch or slot 37 is substantially aligned with the top edge surfaces of the housing plates. The inner or forward end surface 38 defining the slot 37 is defined by a part cylindrical surface. The forward edge surface 39 of the cam plate 27 is also formed on a radius which is concentric with the surface 38. The forward and lower portions of the slide beam assembly has a forwardly open notch 42 defined therein which fits over a pivot roller 43 that in turn is mounted between the slide housing plates 14.

A pair of control arms 44, 44 are pivotally mounted about a common pivotal axis 45 which in turn is mounted in the vertical plates 17. The control arms 44 are mounted so that one is on each side of the beam assembly and one arm is outside of each of the plates 17. The two control arms 44 are mounted on their common pivot, as shown, and in turn a pivot roller 46 is mounted between the arms. The pivot roller is positioned so that it is within slot 37 defined in the cam plate 27. A pair of tension springs 47 are mounted as at 48 adjacent the lower portions of the control arms 44, respectively, and each of the tension springs 47 extends rearwardly and upwardly and is mounted through a gang plate 53. A bolt 51 passes through to a bracket 52 that in turn is mounted to the standard plates 30. The bolt is threaded into a nut on the gang plate to provide suitable adjustment. The bolt can tighten or loosen the two springs.

As previously explained, the slide beam assembly 25 which comprises the slide bar 26 and cam plate 27 together with the standard plates, standard and mold board, is mounted for sliding movement between the plates 14, 14 of the beam assembly. The housing plates 14, 14 are held in spaced apart position by suitable spacers and bolts. Spacers and bolts are also positioned between the upright plates 17 and the angle clips 22. If the slide beam assembly comprising bar 26 and cam plate 27 wears from sliding movement back and forth between the housing plates suitable adjustment means for changing the spacing between plates 14 can be provided. It can thus be seen that the plow share 32 is free to move fore and aft between the side plates 14, 14 if it can overcome the tension of the tension springs 47. The movement rearwardly is limited, and once the roller 46 seats against the curved surface 38 of the slot in which it is positioned, the cam and beam can no longer move rearwardly. Then only pivotal movement about the axis of the roller 46 would be permitted. Prior to the rearward movement it is possible for the trip beam or slide beam assembly 25, including the share 32, to pivot about the axis of pivot from roller 43 before the notch 42 is released. Therefore, the slide assembly can move about two pivots against the action of the springs.

Specifically, as seen in FIG. 6, the force components from the springs 47, 47 include a component ($F_{sy}$) tending to resist movement of the slide beam assembly, including the plow share 32, in a vertical direction and a component ($F_{sx}$) of spring force tending to hold the slide beam assembly seated. The assembly will normally be supported on roller 43 and roller 46. Also, the roller 46 acts to hold the slide beam assembly down so that the notch 42 is seated on the front pivot roller 43. The position shown in FIG. 2 is the normal plowing position for the unit.

It can be seen that the slide beam assembly 25, including the plow share 32 and its attached parts can pivot about two different pivotal axes. The first of the axes is the axis of the roller 43, so that if the plow share beam assembly strikes an obstruction but does not move rearwardly, the entire slide beam assembly will tend to pivot about this axis.

The second pivot point for the slide beam assembly unit is about the axis of the pivot roller 46, which will be termed the rear pivot of the unit (the roller 43 is termed the front pivot). The axis of roller 46 will be the pivot point of the unit if the plow share 32 strikes an obstruction and the resultant force is such that the slide beam moves rearwardly so the front of the cam plate 27 clears the roller 43 so that it is no longer seated in the notch 42.

In FIG. 6 the effective lever arms and forces are schematically shown. The lever arms T and K are both approximately equal to 3L and N maybe equal to G. $F_{sy}$ is vertical spring force and $F_{sx}$ is horizontal spring force. $F_p$ is the force on the plow share during plowing.

Taking the sum of the moments about each of the pivots 46 and 43 (neglecting the weight of the beam) shows that with a spring force angle ($\theta$) of about 10° from the horizontal and the lever arm ratios as shown and considering friction it will take approximately three times more force to slide the beam back than it will to pivot the unit about roller 43 (arc $B_a$). This ease of pivoting about roller 43 cushions shocks and reduces wear on the shares.

A moldboard plow is difficult to protect against obstructions due to the extremely heavy load of plowing, large variations in draft ($F_p$) of different soils and varying conditions, the side thrust of the share, and the necessity of close alignment of the members for doing an even job of plowing.

In FIG. 6 the beam can pivot about 46 or about 43, depending on the nature of the obstruction.

If the beam pivots about 43, there is an immediate vertical component in the arc of movement. This permits the share to ride over the numerous small or sloping obstacles encountered. Since there is no extended swinging when going over small objects, the moldboard and share are in plowing position, and continue to plow even though going over an obstruction. As can be determined from a force analysis, it takes a force roughly three times greater to slide the beam back, disengage the lock roller 43 and pivot about 46 than it does to pivot about 43 only. This is as it should be. The force of roller 46 tending to restrain pivoting about 43 should be equal to the average load of plowing. Then, rather than having to push the numerous small obstructions out of the way or throwing the plow in the air, the beam can pivot about 43. Some pivoting about 43 also is desirable if a hard spot is encountered, since it increases the angle of penetration of the share and consequently helps the plow to penetrate these hard spots. There also is a strong indication that the shock absorbed by the springs 47 from obstructions and hard spots reduce the draft of the plow. In the improved mechanism, the two large springs 47 attached to 44 restrain the roller 46 from pivoting upward about pivot 45.

The force at 46 can be changed without substantially changing the horizontal component of the spring ($F_{sx}$) by changing the springs to the different holes in 44. The roller at 46 may be locked solidly for extremes in plowing conditions by inserting pins in 17A.

Should the nature of the obstruction be such that it does not permit sufficient vertical movement to clear the obstruction, the horizontal force on the beam will increase, the beam will slide back and disengage lock roller 43. Then the beam will pivot about 46, gradually increasing the tension on the springs 47. After passing the obstruction, the springs 47 will immediately return the beam to the original position. The beam may swing about 46 to clear a large sharp object since extended swinging about 46 is possible and 46 is located slightly behind the point of the share. The force of the springs 47 to permit rearward sliding of the beam 26 should be large enough to handle the minimum load and variations in soil and conditions and a reasonable shock load. In the extended swinging about 46 the share moldboard must swing back so far to clear the obstacle that they are not in plowing position. Therefore constant swinging about 46 is not desirable as it is about 43. The force restraining movement about 43 can therefore be less than about 46. A much softer cushion is provided by swinging about 43 than about 46.

Now referring specifically for FIG. 3, when the unit is in normal plowing position the plow share and the slide beam assembly are in the position shown in dotted lines at 60.

However, if the plow share strikes a rock illustrated in dotted lines at 61 as the plow moves forwardly the plow share will be held on the rock and will yield against the tension or force of the springs 47 to the relative position as shown in dotted lines at 62. It can be seen that in this position the front edge surface 39 of the cam plate 27 will clear the front pivot roller 43 and the rear pivot roller 46 will be seated in the forward end of the notch or against the semi-cylindrical surface 38. When this happens the plow share 32 and the slide beam assembly will commence pivoting about the axis of roller 46 in order to clear the rock 61. It should be noted that the pivotal axis of roller 46 is positioned so that the point of the plow share 32 will move only slightly downwardly as it pivots about this axis inasmuch as it is slightly behind and above the point of the plow share. As the plow moves forwardly the plow share will scrape along the top of the rock 61 forcing the trip beam assembly pivot about axis 46. As the plow share slides along the top of the rock, which is shown on the solid lines at 64, the springs 47 will be increasing in tension because of the geometry of the unit. Note that because the attaching point 48 of the springs is spaced from the axis of roller 46, that the spring 47 will extend an amount proportional to the difference between lines 68 and 69. Line 69 represents the arc of movement that the rear portion (where the springs 47 attach) of the trip beam assembly 25 moves as it pivots and line 68 represents the arc of the spring at its initial length. The difference between the lines 68 and 69 thus represents the increase in length of the spring as it moves between the normal plowing position and the tripped position which is shown at 65 in FIG. 3.

Thus, once the plow share 32 commences to clear the rock 64 there will be an increasing spring force which is represented graphically by the difference in distance between lines 68 and 69 tending to return the plow share 32 to its normal position. One component of the spring force will continue to urge the cam plate 27 against the roller 43. As the plow share clears the rock the plow share 32 will engage the ground again and the trip beam will, under the urging of the springs 47, return to its normal position with the roller 43 securely seated in the notch 42 of the cam plate.

Note that the springs 47 also exert a force tending to rotate the arms 44 about their axes 45 to thereby seat the roller 46 carried on the arms, on the upper edges of the slide housing plates 14, 14. The springs will also exert a force tending to move the front portions of the cam plate and trip beam assembly in direction as indicated by arrow 67 about the axis of roller 46 and thus return the trip beam 32 to its normal plowing position. Further, the force component of the springs will urge the trip beam forwardly so that the forward edge of the cam plate rides on the roller 43 in all of its positions.

Not only will the slide beam assembly pivot about the axis of roller 46, as previously described, when the force on the share 32 in rearward direction exceeds the opposing horizontal component of the springs 47 so that the notch 42 clears the roller 43. However, if the plow share strikes a rock and the rearward force isn't great, the unit will pivot to position as shown in FIG. 5. The rock 70 is of a submerged rounded type so that when the plow share 32 strikes it there is very little rearward force but the movement about roller 43 tends to lift the plow share upwardly. This force is represented by the arrow 71 in FIG. 5. The notch 42 will remain securely seated on the roller 43. The slide beam assembly 25 will then move upwardly in direction as indicated by the arrow 71 about the axis of the roller 43. The slide housing plates 14 are, as stated previously, spaced apart to allow the slide beam assembly 25 to move upwardly. However, when the beam assembly starts to move upwardly, the upper edge surface of the slide bar 26 will engage the roller 46 on the arms 44, 44 and will exert a force tending to pivot the arms 44, 44 about their axis 45 in direction as indicated by the arrow 72.

The springs 47 will thus be extended by the arms and the springs 47 will exert an increasing force not only to hold the slide beam assembly forwardly so that the notch 42 remains seated on the roller 43, but also will exert an increasing force tending to rotate the arms 44, 44 in direction opposite from that indicated by arrow 72. This force in turn will be exerted on the slide bar 26 and will create an opposing force which will tend to move the plow share 32 and the slide beam assembly downwardly toward the ground. Thus, as soon as the plow share 32 passes over the rock 70 springs 47 will continue to urge the slide beam assembly 26 into its normal seated position.

The pivoting of the slide beam assembly about front roller 43 permits yielding of the plow share without full tripping of the unit.

The slide beam assembly has a projection 73 partially defining the notch 42 at the forward end thereof which tends to lock the beam on the pivot roller 43 unless the force on the plow share in rearwardly direction will move the unit rearwardly a sufficient amount so that notch 42 completely clears roller 43. This prevents any tendency of the slide beam assembly to become unseated from the roller during normal use or tending to move upwardly so that the notch will slide off the roller.

The beam mounting of the present invention, thus, insures that the springs 47, 47 will always be exerting a force tending to return the plow share 32 or other earth working tool to its normal working position, regardless of which pivot the beam pivots about, the front pivot roller 43 or the rear pivot roller 46.

It should be noted that the positioning of the rear pivot roller 46 is such that when the cam beam 27 moves rearwardly so that the notch 42 clears the front roller 43 and the slide beam assembly 25 pivots about the axis of roller 46, the point of pivoting is slightly behind and above the point of the plow share. Thus the plow share point will not dig downwardly a great deal as it pivots rearwardly. Further, positioning of the pivot point almost directly above the point of the plow share eliminates a good deal of the "fish-hook" effect which is present in some of the other types trip beam plows where the pivot point for the plow share when the share goes to its fully tripped position is a substantial distance ahead of the plow share. With the pivot point a substantial distance ahead of the share the main force of the share will tend to be in a horizontal direction with a smaller vertical component. The beam assembly will therefore not pivot freely upwardly but will tend to "fish-hook" on the rock or obstruction. The beam will thus absorb a good deal of horizontal force before pivoting clear of the rock. This can cause undue stress to the plow frame and premature failure.

The added extension of the springs tending to return the plow share to its normal working position is accomplished by the use of the different locations of the attachment points of the springs with respect to the pivot point of the trip beam assembly. There is no need for cams or other devices which will make the springs extend as the plow beam pivots. The front surface 39 of the cam is concentric with the axis of the surface 38.

The plates 17, 17 mount the arms holding roller 46 and extend forwardly and upwardly to the support beam 23. With the beam above the mechanism, the vertical depth of the beam can be increased to obtain as much strength as necessary to support a plurality of beams in a gangplow. This is shown schematically in FIG. 7. Further, the forward inclination of plates 17 provides clearance for roller 46 to move up when the beam pivots about roller 43 and also positions the box support beam 23 forwardly to provide clearance at the rear of the support beam for the trip beam (see FIG. 3). The trip beam can pivot at least 45°, when fully tipped. In gang plows having 5–6 or more bottoms, the ability to increase the strength of the support beam is very important. Increasing the vertical height greatly increases the strength. The plows are supported at the front and with a tail wheel at the rear of the plow. The support beam carries the weight of the trip beam between these supports.

Further, the use of only two springs which have both a horizontal component of force and a vertical component of force permit the beam to pivot about the two separate pivot points, as described, without having separate sets of springs for obtaining the force in both horizontal and vertical directions. The beam will automatically reset no matter which pivot the beam moves about.

Bolt and spacer 22A provide a stop for the beam in the fully tripped position. To compensate for different plowing conditions the springs 47 may be anchored in different holes 48. Stub pins may be inserted in holes 17A of brackets 17 to lock the arms and roller 46 down for extremely heavy plowing. The pins insure that the only pivot usable is roller 46 so the beam won't pivot excessivley about the roller 43 due to heavy pulling on the plow bottom. The stub pins extend out and prevent arms 44 from pivoting up.

What is claimed is:

1. A trip beam attachment for an earth working implement comprising a main beam, a trip beam mounted on said main beam, means on said trip beam defining a first pivot adjacent the forward edge thereof, said pivot having an axis located ahead of the most forwardly point of the earth working tool on said trip beam, means defining a second pivot between said main beam and said trip beam, said second trip pivot having a pivotal axis above and slightly behind the forward point of the earth working tool on said trip beam, said trip beam having portions thereof extending rearwardly of said second pivot, a spring member having a first end mounted to said trip beam, means carried by said main beam for mounting the second end of said spring including an arm pivotally mounted to said main beam about a pivotal axis substantially parallel to the axis of said second pivot, said arm also having a portion mounting a roller, and said roller fitting within a notch defined in said trip beam, said roller, said notch and said arm comprising the means defining said second pivot, the mounting of said spring between said trip beam and said main beam being positioned so that whenever said trip beam moves about said first pivot or said second pivot the force of the spring urging the earth working tool in a downwardly direction will increase due only to the geometry of the mounting thereof.

2. The combination as specified in claim 1 and means to transfer movement of the trip beam about said first pivot to said roller and arm in a direction to increase downward force of the spring on the earth working tool when the trip beam and earth working tool pivots upwardly.

3. The combination as specified in claim 2 wherein the spring is an extensible tension spring and extends from its attachment to the arm upwardly and rearwardly to its attachment to the trip beam.

4. The combination as specified in claim 3 and a cam plate adjacent the forward portions of said trip beam, the forward edge surface of said cam plate being formed on a radius with its axis at the axis of said second roller, the said forward edge surface of said cam plate riding against said first roller as the trip beam pivots about its second pivot.

5. A trip beam attachment for an earth working implement comprising a main beam, a trip beam mounted on said main beam, said trip beam carrying an earth working tool which has a normal ground engaging position, means on said trip beam and said main beam for mounting said trip beam to said main beam about two separated pivots, a first of said pivots being a forward pivot formed by a forwardly open notch in said trip beam, a first roller on said main beam, said notch fitting over the first roller, the second pivot including a rearwardly open notch in said trip beam, a second roller within said rearwardly open notch, and arm members for mounting said roller, said arm members being pivotally mounted to said main beam about an axis substantially parallel to and spaced rearwardly from the axis of said roller, an extensible spring being mounted to the arm member at position below the pivot axis of the arm members, and to said trip beam at the rear portion thereof to urge said trip beam towards its normal working position, the mounting of said spring on said arm member and said trip beam being such that as said trip beam moves about said first pivot against the force of said spring, said arm member will be moved by the trip beam acting on the second roller to increase the tension of said spring, said trip beam being slidable rearwardly against the force of said spring to position where the forwardly open notch clears said first roller and is free to move about said second pivot against the force of said spring, and as said trip beam moves about said second pivot, the spring increases in tension as said trip beam moves from its normal working position, due to only to the location of the points of attachment of said spring and the location of the axes of said second pivot.

6. In an earth working tool, a trip beam movable about two separated pivots, one ahead of the other, a pair of slide plates, said trip beam being slidably positioned and held for pivotal movement between said slide plates, a support beam for supporting the slide plates and being spaced above the slide plates, connecting plates between the support beam and the slide plates, arm means mounted on said connecting plates and extending forwardly therefrom, said other pivot being carried by said arm means, said connecting plate being inclined forwardly from their attachment points on the slide plates to position said support beam substantially directly over the other pivot, thereby providing clearance at the rear of the support beam for the trip beam when it pivots about the other.

7. The combination as specified in claim 6 wherein there are a plurality of the earth working tool assemblies attached to the support beam.

8. In a plow assembly, a plurality of trip beam assemblies, each including a trip beam member movable about two separated pivots, one ahead of the other, a pair of slide plates, each said trip beam being slidably positioned and held for pivotal movement between a separate pair of said slide plates, a support beam for supporting the slide plates and being spaced above the slide plates, a separate connecting plate between the support beam and each of the slide plates, separate arm means for each trip beam member mounted on the respective connecting plates and extending forwardly therefrom, said other pivot of each trip beam assembly being carried by said arm means, said connecting plates being inclined forwardly from their attachment points on the slide plates to position said support beam substantially directly over the other pivot, thereby providing clearance at the rear of the support beam for each of the trip beam members when it pivots about the other.

9. In a moldboard plow assembly having a plurality of plowing bottoms each having a plow share thereon and arranged in gang plow position, and a separate individual trip beam assembly for each of said plowing bottoms, the improvement comprising improved frame means for holding the separate trip beam assemblies relative to each other, said separate trip beam assemblies each including a pair of spaced apart guide plates; a trip beam member comprising a horizontal bar section, a standard attached to the horizontal bar section and a plow bottom attached to the standard, said horizontal bar section being of substantial length and mounted between the pair of guide plates for that main beam assembly and pivotally mounted to the guide plates about at least one transverse pivotal axis lying substantially directly above the leading portion of the plow share on that plow bottom attached to that trip beam member, said standard extending rearwardly and upwardly from the plow bottom attached thereto, separate gusset means holding each standard and horizontal bar section in assembly, said gusset means being positioned on the sides of the horizontal bar section; bias means to yieldingly retain each of the trip beam members in plowing position; a support beam extending obliquely to the trip beam asemblies and substantially overlying the pivotal connections between each trip beam member and its associated pair of guide plates, said guide plates of each trip beam assembly extending rearwardly from the respective pivots to support the horizontal bar section of the associated trip beam member substantially as far back as the associated gusset means; and separate support means to connect said support beam to each of said trip beam assemblies and retain said support beam spaced a substantial distance above the trip beam assemblies and to support the trip beam assemblies from lateral movement relative to each other, said separate support means comprising spaced apart support plate means for each trip beam assembly, one support plate means being fixed to each of the guide plates of that trip beam assembly and to the support beam, thereby holding the guide plates together and to the support beam and straddling the associated trip beam member to permit each trip beam member to move about its pivot between its guide plates against the action of its associated bias means.

10. The combination as specified in claim 9 wherein said support beam is positioned above each of the trip beam members a sufficient distance so that each trip beam means can pivot substantially 45° from its normal working position in upwardly direction before striking the support beam.

11. In a moldboard plow assembly, a plurality of trip beam assemblies, each trip beam assembly including a trip beam member carrying a moldboard and share and movable about a transverse pivot normally lying substantially above the forward portion of the share, each trip beam member being movable about its pivot from a ground engaging position to a tripped position, each trip beam assembly further including a mounting housing comprising two mounting plates between which the associated trip beam member is pivoted, a support beam for holding the mounting housings in transversely spaced relationship to form a gang plow, said support beam extending at an oblique angle to the direction of movement of said plow and to the mounting housings, separate connecting means between each of the mounting housings and the support beam, said separate connecting means each comprising a pair of support members fixed to the mounting plates of the respective mounting housings and extending upwardly from the respective mounting plates, means to fixedly attach said support members to the support beam, each trip beam member moving between the associated support members about its pivot when it trips, said support beam being spaced above each of said trip beam assemblies a substantial distance, said support beam lying substantially directly over the pivotal connections between the trip beam members and their respective mounting plates, separate control arm means and for each trip beam assembly, means to pivotally mount each control arm means with respect to its respective trip beam assembly about an axis substantially parallel to the pivot axis of its respective said trip beam, each of said control arm means including a first portion and a second portion, mechanical force transfer means between the first portion of said control arm means and its associated trip beam to directly transfer movement of said trip beam about its pivot to its associated control arm means to cause said control arm means to move about the control arm pivot, said mechanical force transfer means transferring movement to said control arm means at a first predetermined point, and separate bias means yieldingly resisting movement of each of said control arm means about its pivot, said bias means comprising tension spring means, one end of said tension spring means being attached for non-sliding motion to the second portion of said control arms means at a point which is spaced from a line drawn between the control arm pivot axis and the point of attachment of said mechanical force transfer means a preselected amount, means to attach the opposite end of said tension springs means to a portion of said plow assembly so that upon movement of a trip beam about its pivot the associated bias means is tensioned.

12. In a moldboard plow assembly having a frame, the improvement comprising a trip beam attachment for the plow including a main beam comprising a pair of spaced apart guide members, a trip beam carrying a plowing tool pivotally mounted between said guide members for movement about a transverse pivot defined between the members so that the trip beam will be permitted to move upwardly from a normal working position when encountering an obstruction, control arm means, means pivotally mount said control arms means to said main beam, about an axis substantially parallel to the pivot axis of said trip beam, said control arm means including a first portion and a second portion, mechanical force transfer means between the first portion of said control arm means and said trip beam to directly transfer movement of said trip beam about its pivot to the control arm means to cause said control arm means to move about the control arm pivot, said mechanical force transfer means transferring movement to said control arms means means at a first predetermined point, and bias means yieldingly resisting movement of said control arm means about its pivot, said bias means comprising tension spring means, one end of said tension spring means being attached for nonsliding motion to the second portion of said control arm means at a point which is spaced from a first line drawn between the control arm pivot axis and the point of attachment of said mechanical force transfer means, and positioned so that the smallest included angle between the first line and a second line from the control arm pivot axis and the point of attachment of the spring means is substantially less than 180°, means to attach the opposite end of said tension spring means to a portion of said plow assembly so that upon movement of said trip beam about its pivot axis the bias means are tensioned.

13. The combination as specified in claim 12 and means to position the pivotal axis of said control arm means with respect to the force transfer means and the bias means so that the effective lever arm through which the the tension spring means act to restrain movement of the control arm decreases as the trip beam moves away from its normal working position.

14. The combination as specified in claim 12 wherein said force transfer means transfers compression forces to said control arm means from said trip beam as said trip beam pivots about its transverse pivot.

15. The combination as specified in claim 12 wherein said force transfer means comprises a roller rotatable mounted on the control arm means and engaging a portion of the trip beam.

(References on following page)

References Cited

UNITED STATES PATENTS

| | | | |
|---|---|---|---|
| 3,202,223 | 8/1965 | Fulton | 172—264 |
| 3,277,967 | 10/1966 | Weispfenning | 172—705 |

FOREIGN PATENTS

| | | |
|---|---|---|
| 594,258 | 3/1960 | Canada. |
| 283,397 | 4/1915 | Germany. |
| 24,498 | 12/1962 | Germany. |
| 89,168 | 6/1960 | Denmark. |
| 650,464 | 10/1962 | Canada. |

ROBERT E. PULFREY, Primary Examiner

J. W. PETERSON, Assistant Examiner

U.S. Cl. X.R.

172—710

PO-1050
(5/69)

UNITED STATES PATENT OFFICE
CERTIFICATE OF CORRECTION

Patent No. 3,468,382  Dated September 23, 1969

Inventor(s) Sherman H. Quanbeck

It is certified that error appears in the above-identified patent and that said Letters Patent are hereby corrected as shown below:

Column 7 line 21, after "about" delete "the". Column 8, line 23, "towards" should be --toward--; line 35, after "due" delete "to" line 47, "plate" should be --plates--. Column 10, line 1, delet "and"; line 33, after "means" (second occurrence), insert --to-- line 34, after "beam" delete ","; line 63, delete "the" (first occurrence); line 71, "rotatable" should be --rotatably--.

SIGNED AND
SEALED

JUL 7 1970

(SEAL)
Attest:

Edward M. Fletcher, Jr.
Attesting Officer

WILLIAM E. SCHUYLER, JR.
Commissioner of Patents